(12) United States Patent
Chen

(10) Patent No.: US 11,725,792 B2
(45) Date of Patent: Aug. 15, 2023

(54) HEADLIGHT SOCKET

(71) Applicant: Wen Chen, Parkland, FL (US)

(72) Inventor: Wen Chen, Parkland, FL (US)

( * ) Notice: Subject to any disclaimer, the term of this patent is extended or adjusted under 35 U.S.C. 154(b) by 31 days.

(21) Appl. No.: 17/564,942

(22) Filed: Dec. 29, 2021

(65) Prior Publication Data
US 2022/0205604 A1 Jun. 30, 2022

Related U.S. Application Data

(60) Provisional application No. 63/131,435, filed on Dec. 29, 2020.

(51) Int. Cl.
*F21S 41/19* (2018.01)
*B60Q 1/04* (2006.01)

(52) U.S. Cl.
CPC ............... *F21S 41/19* (2018.01); *B60Q 1/04* (2013.01)

(58) Field of Classification Search
CPC .................................. F21S 41/19; B60Q 1/04
See application file for complete search history.

(56) References Cited

U.S. PATENT DOCUMENTS

| | | | | |
|---|---|---|---|---|
| 4,513,356 A | * | 4/1985 | Mikola | F21S 41/198 362/267 |
| 4,747,023 A | * | 5/1988 | Ball | B60Q 1/0683 362/523 |
| 5,115,381 A | * | 5/1992 | Van Heeswijk | F21S 41/192 362/519 |
| 5,216,319 A | * | 6/1993 | Van Heeswijk | H01J 5/56 313/318.09 |
| 5,479,066 A | * | 12/1995 | Willems | H01K 1/46 362/267 |
| 5,513,082 A | * | 4/1996 | Asano | F21V 19/0025 248/222.12 |
| 7,083,476 B2 | * | 8/2006 | Helbig | H01R 33/06 439/619 |
| 2002/0006043 A1 | * | 1/2002 | Dinant | F21S 45/10 362/546 |

* cited by examiner

*Primary Examiner* — Bryon T Gyllstrom

(57) ABSTRACT

The headlight socket has a socket, a locking tab, a light bulb surface, a left alignment guide and a right alignment guide. The socket is a plastic section that can hold a vehicle headlight lightbulb. The locking tab holds the headlight inside a standard vehicle headlight housing. The left alignment guide is a curved C shape section that positions the headlight socket within the vehicle headlight housing. The left alignment guide is mirrored across the locking tab to create the right alignment guide. The locking tab additionally has an upper lip that allows it to be pushed and pulled more easily. On the light bulb surface the socket has a indents, holes, and a wiring ridge. The plurality of indents are slots that provide space for additional wiring attached to the vehicle headlight.

1 Claim, 8 Drawing Sheets

HEADLIGHT SOCKET

FIELD OF THE INVENTION

The present invention generally relates to a vehicle headlight device. More specifically, the present invention relates to a socket used with a headlight for a vehicle.

BACKGROUND OF THE INVENTION

The automotive industry is constantly improving and developing new technology to ensure each vehicle can run and perform better than their previous model. Within the industry various parts are required to ensure the vehicle complies with industry standards and to ensure proper safety for the vehicle while in use. Vehicle headlights provide visibility for the vehicle in dark and bad weather conditions. Unfortunately, many of the parts within the vehicle headlight are inefficiently designed making them hard to install and making them more likely to break. These defective designs can sometimes cause vehicle fires, impairing the driver and ruining the headlight components. The present invention is designed to improve conventional headlight sockets with an innovative socket device that provides convenient, effective, and safe means to install light bulbs within a vehicle while incorporating other problem-solving features.

DETAIL DESCRIPTIONS OF THE INVENTION

Figure 1:
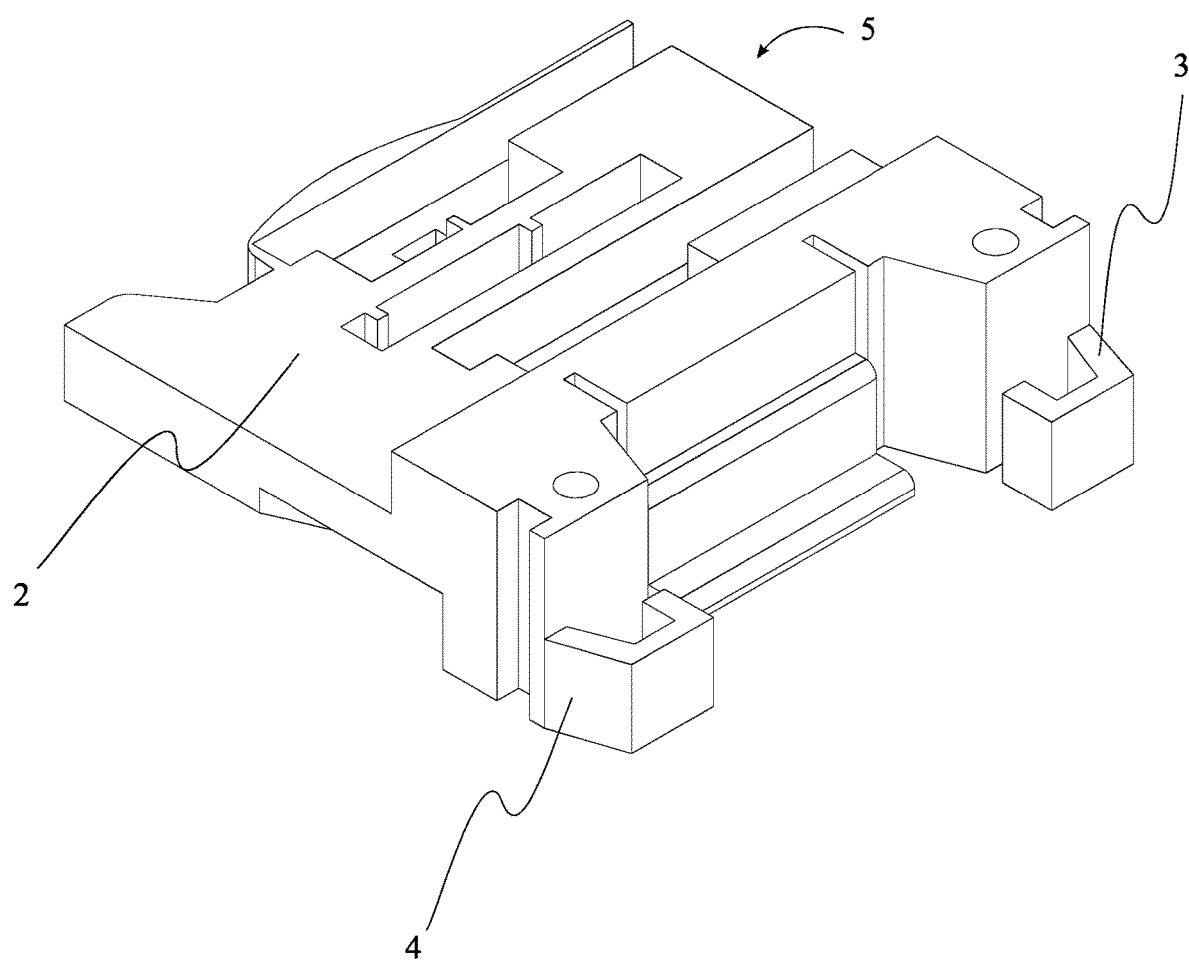
FIG. 1 is a top perspective view of the present invention.
Figure 2:
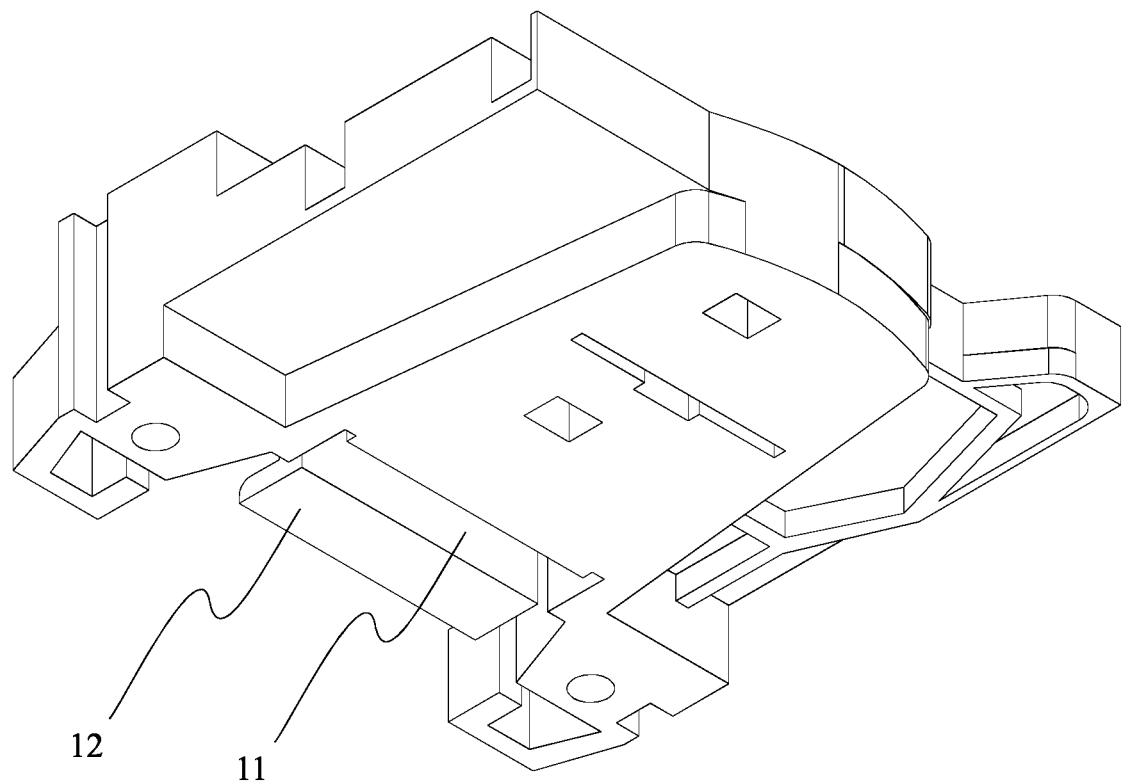
FIG. 2 is a bottom perspective view of the present invention.
Figure 3:
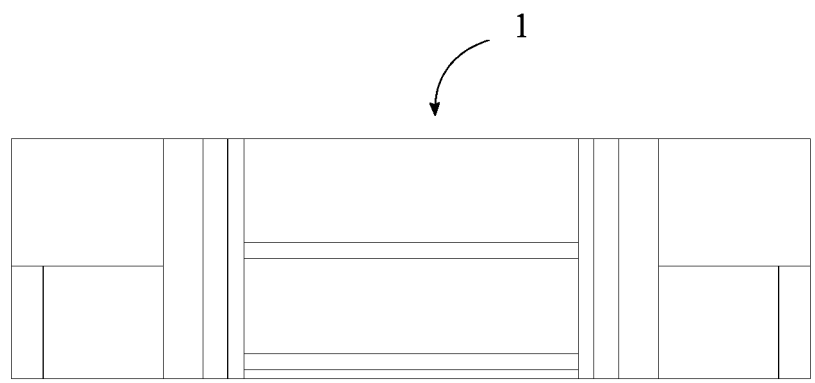
FIG. 3 is a front view of the present invention.
Figure 4:
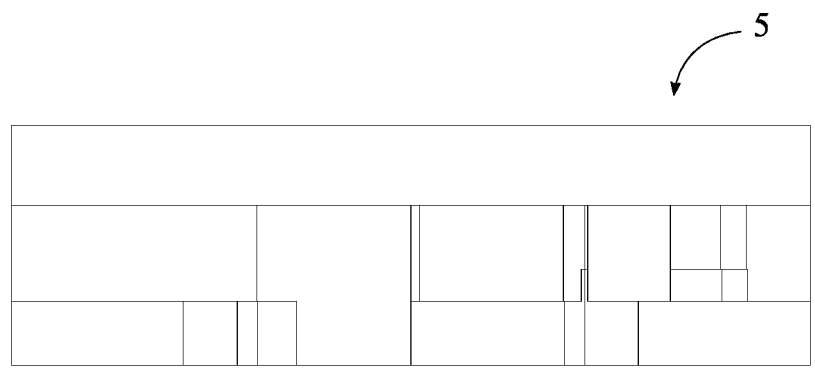
FIG. 4 is a rear view of the present invention.
Figure 5:
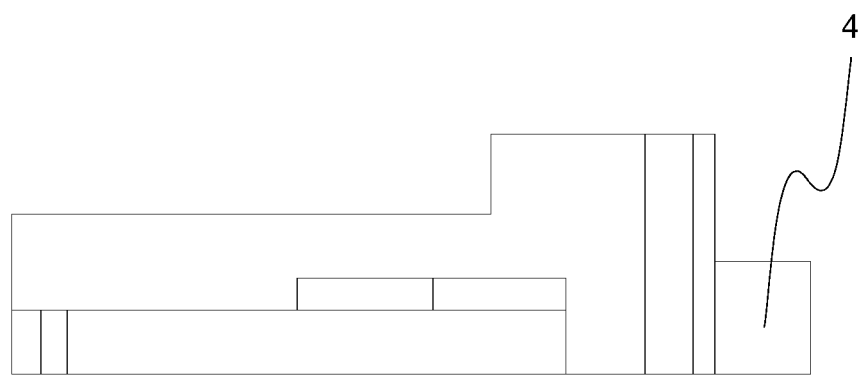
FIG. 5 is a right-side view of the present invention.
Figure 6:
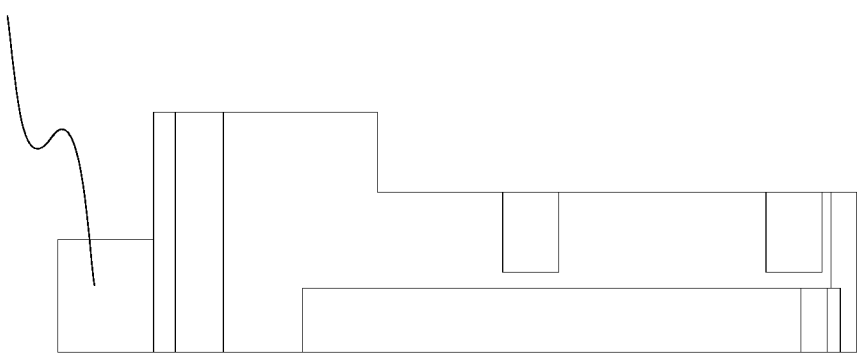
FIG. 6 is a left-side view of the present invention.
Figure 7:
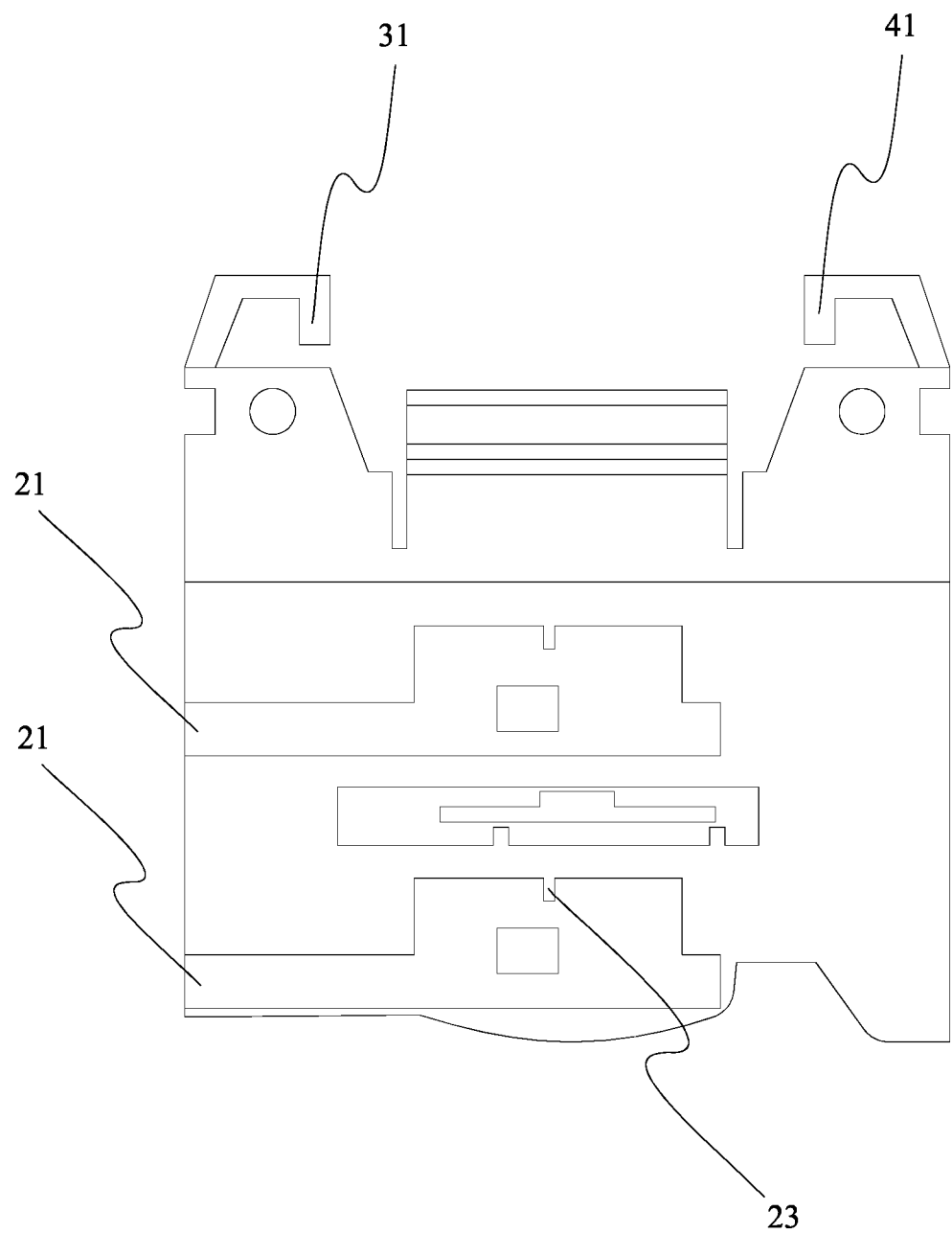
FIG. 7 is a top view of the present invention.
Figure 8:
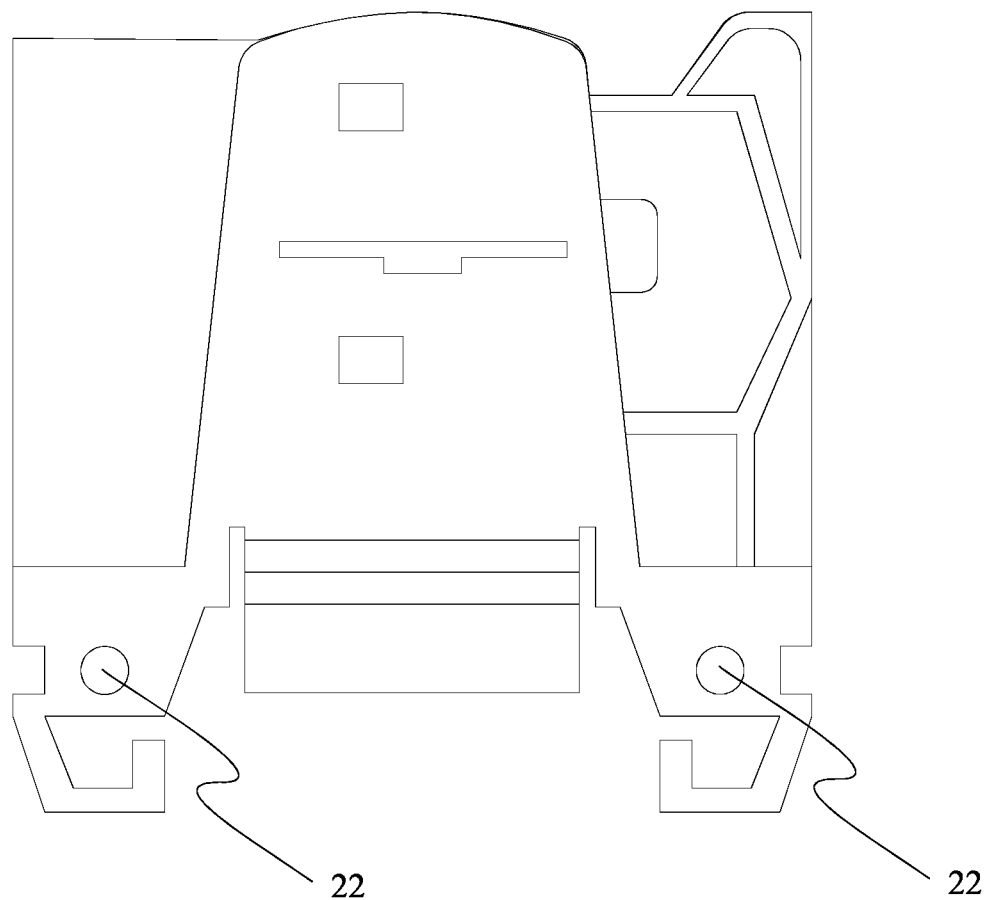
FIG. 8 is a bottom view of the present invention.

All illustrations of the drawings are for the purpose of describing selected versions of the present invention and are not intended to limit the scope of the present invention.

The preferred embodiment of the present invention comprises a socket 2, a locking tab 1, a light bulb surface 5, a left alignment guide 3 and a right alignment guide 4. The socket 2 is a groove made of plastic designed to receive a vehicle headlight lightbulb. The vehicle headlight lightbulb is an external device chosen by the user to be used with the present invention. The locking tab 1 is designed to properly secure the present invention within a vehicle headlight housing. The vehicle headlight housing is an external structure on a vehicle that the present invention is placed within. The light bulb surface 5 is the side of the present invention that comes into contact with the vehicle headlight. The left alignment guide 3 is a curved section that properly positions the present invention within the vehicle headlight housing. The right alignment guide 4 is another curved section that properly positions the present invention within the vehicle headlight housing. The locking tab 1 further comprises a wall 11 and an upper lip 12. The upper lip 12 is a ridge that juts out from the wall 11 allowing the locking tab 1 to be engaged with. The socket 2 further comprises a plurality of indents 21, a plurality of holes 22, and at least one wiring ridge 23. The plurality of indents 21 are gaps that receive the wiring necessary for the vehicle headlight. The wiring ridge 23 is a rectangular component that holds the necessary wiring within the present invention. The socket 2 is integrated into the light bulb surface 5 of the main body. As a result, the socket 2 will secure a vehicle headlight facing forward within the vehicle. The locking tab 1 is mounted perpendicularly offset to the socket 2. Consequently, the locking tab 1 can engage with the vehicle without interfering with the socket 2. The wall 11 is integrated into the locking tab 1. Accordingly, the wall 11 provides structure to the locking tab 1 and can be bent without breaking off. The wall 11 extends vertically away from the light bulb surface 5. Thus, the wall 11 is easily interacted with by the user's finger. The plurality of indents 21 is integrated into the socket 2. So, the plurality of indents 21 creates a space to receive the pigtail like socket 2 of the headlight lightbulb. The plurality of indents 21 traverses along the socket 2 parallel to the wall 11. As a result, the plurality of indents 21 can receive other wiring connected to the headlight lightbulb. The plurality of holes 22 traverses through the main body. Consequently, the plurality of holes 22 creates openings on the light bulb surface 5 and the opposite side of the present invention. The wiring ridge 23 is mounted on perpendicular to a lateral sidewall of the plurality of indents 21. Accordingly, the wiring ridge 23 secures any wiring placed within the plurality of indents 21. The upper lip 12 is perpendicularly mounted to the wall 11. Thus, the upper lip 3 extends from the wall 11 to make outside interaction with the wall 11 more accessible. The left alignment guide 3 further comprises a left hook 31. The left hook 31 is a curled C shape section. The left alignment guide 3 is mounted offset the main body perpendicular to the locking tab 1. So, the left alignment guide 3 secures the present invention to a vehicle headlight housing. The left hook 31 is integrated into the left alignment guide 3. As a result, the left hook 31 can be fastened or slid onto any thin component within the vehicle headlight housing. The right alignment guide 4 further comprises a right hook 41. The right hook 41 is a curled C shape section that mirrors the left hook 31. The right alignment guide 4 is mounted offset the main body perpendicular to the locking tab 1. Consequently, the right alignment guide 4 further secures the present invention to a vehicle headlight housing. The right hook 41 is integrated into the right alignment guide 4. Accordingly, the right hook 41 ensures the present invention is secured to the vehicle headlight housing in at least two areas. The right alignment guide 4 is positioned offset the locking tab 1 opposite the left alignment guide 3. Thus, the right alignment guide 4 and the left alignment guide 3 do not interfere with the functionality of the locking tab 1.

Although the invention has been explained in relation to its preferred embodiment, it is to be understood that many other possible modifications and variations can be made without departing from the spirit and scope of the invention as hereinafter claimed.

What is claimed is:
1. A headlight socket comprising:
a socket;
a locking tab;
a light bulb surface;
a left alignment guide;
a right alignment guide;
the locking tab further comprising a wall and an upper lip;
the socket further comprising a plurality of indents, a plurality of holes, and at least one wiring ridge;
the socket being integrated into the light bulb surface of a main body of the headlight socket;

the locking tab being mounted perpendicularly offset to the socket;
the wall being integrated into the locking tab;
the wall extending vertically away from the light bulb surface;
the plurality of indents being integrated into the socket;
the plurality of indents traversing along the socket parallel to the wall;
the plurality of holes traversing through the main body;
the wiring ridge being mounted on perpendicular to a lateral sidewall of the plurality of indents;
the upper lip being perpendicularly mounted to the wall;
the left alignment guide further comprising a left hook;
the left alignment guide being mounted offset the main body perpendicular to the locking tab;
the left hook being integrated into the left alignment guide;
the right alignment guide further comprising a right hook;
the right alignment guide being mounted offset the main body perpendicular to the locking tab;
the right hook being integrated into the right alignment guide; and
the right alignment guide being positioned offset the locking tab opposite the left alignment guide.

* * * * *